Jan. 11, 1944.    L. J. MEYER    2,338,956
MACHINE FOR SEPARATING MEATS AND SHELL FRAGMENTS OF EDIBLE NUTS
Filed March 15, 1941

INVENTOR.
LEO J. MEYER
BY
ATTORNEY.

Patented Jan. 11, 1944

2,338,956

UNITED STATES PATENT OFFICE 2,338,956

MACHINE FOR SEPARATING MEATS AND SHELL FRAGMENTS OF EDIBLE NUTS

Leo J. Meyer, San Antonio, Tex., assignor to The Champion Pecan Machine Company, San Antonio, Tex., a corporation of Texas Application March 15, 1941, Serial No. 383,514

3 Claims. (Cl. 183—63)

This invention relates generally to separating machines, and more specifically to machines for separating meats and shell fragments of edible nuts, the predominant object of the invention being to provide a machine for this purpose whose operation involves subjecting bulk material made up of meats and shell fragments of cracked nuts to rapidly moving air which picks up the lighter shell fragments and separates them from the heavier nut meats.

In preparing edible nuts for the market so that the meats thereof may be sold separately and in a completely shelled condition, the nuts are subjected to operations by various machines, said machines including nut-cracking machines which serve to crack the shells of the nuts and shelling machines which serve to separate the meats and the cracked shell portions of the nuts. The shelling machines in use, in most cases, perform their intended function in an efficient manner, yet, because of the nature and condition of the material on which these machines operate numerous fragments of nut shell may be found mixed in with the nut meats after the nut meats have passed through a shelling machine. It was frequently the practice prior to this invention to hand pick the nut meats after they had passed through a shelling machine and remove manually from the nut meats all shell fragments which the shelling machine had not removed. Obviously, this was a slow and expensive procedure.

The purpose of the present invention, therefore, is to provide a machine which is of such improved construction and arrangement that material which has been operated on by a shelling machine may be passed through said improved machine for the purpose of separating from the nut meats any shell fragments which the shelling machine failed to remove, this purpose being accomplished by subjecting the material passing through the machine to rapidly moving air which carries the lighter shell fragments away from the heavier nut meats.

Figures 1, 2, 3:
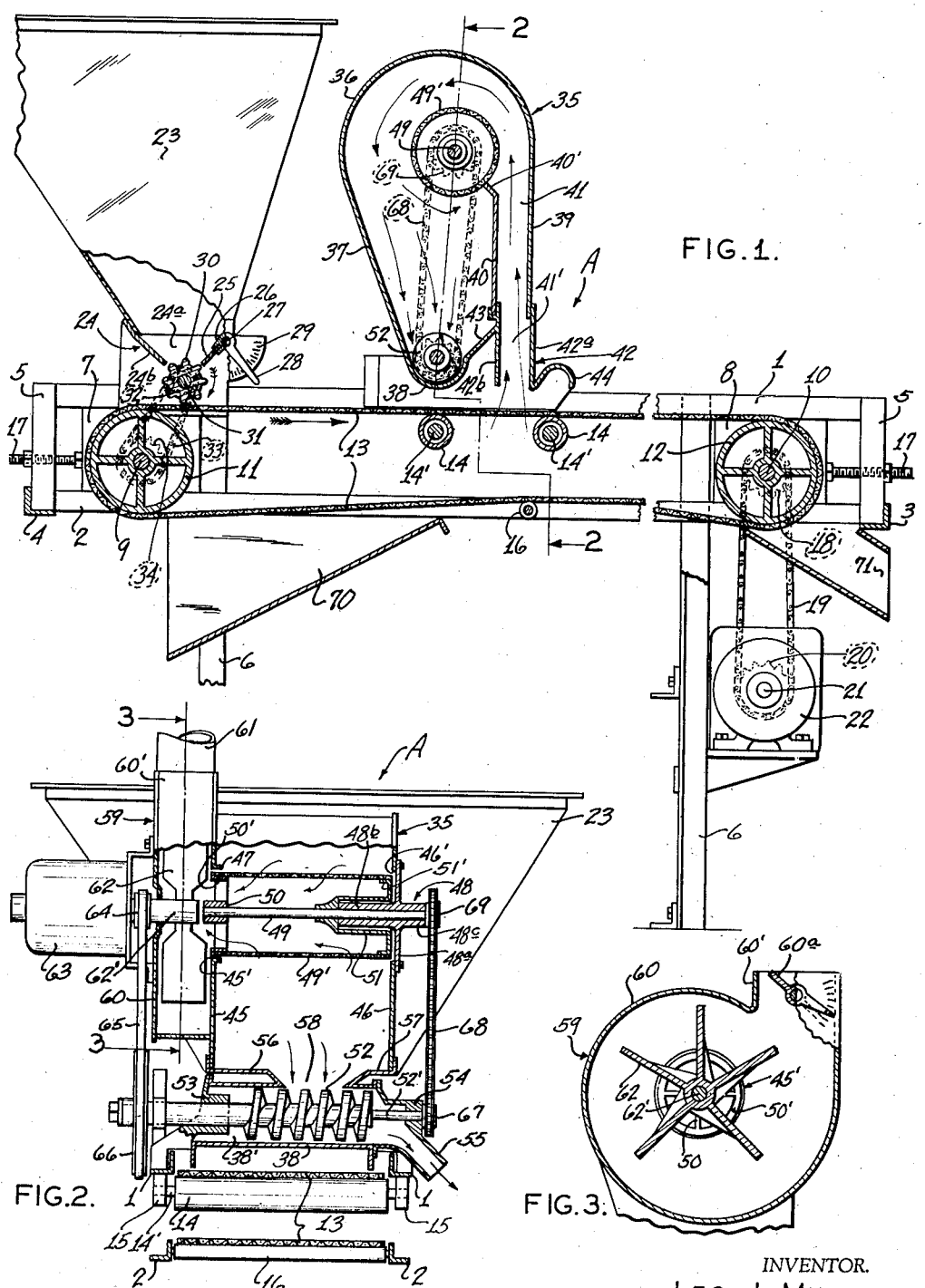
Fig. 1 is a fragmentary vertical section of the improved machine of the present invention.
Fig. 2 is a cross-section taken on line 2—2 of Fig. 1.
Fig. 3 is a fragmentary section taken on line 3—3 of Fig. 2.

In the drawing, wherein is shown for the purpose of illustration, merely, one embodiment of the invention, A designates the improved machine generally. The machine A comprises a supporting frame which includes a pair of transversely spaced, upper angle bars 1 and a pair of similar transversely spaced, lower angle bars 2, said bars 1 and 2 being extended longitudinally of the machine A from end to end thereof. The pair of lower bars 2 are connected together at their forward and rear ends by transverse angle bars 3 and 4, and vertically extended elements 5 which are located at the opposite ends of the bars 1 and 2 are secured to said bars 1 and 2 and to said transverse bars 3 and 4. Also, the frame of the machine A includes legs 6 which serve as supports for the frame of the machine.

The bars 1 and 2 at the opposite sides of the frame of the machine support for sliding adjustment a pair of blocks 7 and 8 which provide bearings for rotary support of a pair of shafts 9 and 10, said shaft 9 having a pulley 11 mounted fixedly thereon and said shaft 10 fixedly supporting a similar pulley 12. Operating over the pulleys 11 and 12 is an endless traveling belt 13 which is produced from material provided with numerous interstices formed therethrough from top to bottom. In other words, said traveling belt may be produced from mesh material, or material made up of numerous spaced links or other parts, or said belt may be made from loosely woven fabric. In short the traveling belt 13 may be formed from any material which is suitable for the purpose and which is characterized by ability to allow air to be drawn therethrough. The upper flight of the endless belt is supported against sagging by a plurality of rollers 14 which are mounted on shafts 14' that are supported by opposed members 15 fixed to the upper angle bars 1 (Fig. 2), and the lower flight of the traveling belt is similarly supported by one or more rollers 16 supported by the opposed, lower angle bars. The blocks 7 and 8 have associated therewith suitable belt tighteners 17 which may be manipulated in an obvious manner, to regulate the tightness of the belt 13 by shifting said blocks longitudinally of the angle bars 1 and 2. The shaft 10 has fixedly mounted thereon a sprocket wheel 18 over which a sprocket chain 19 operates, said sprocket chain operating also over a sprocket wheel 20 which is mounted on the power shaft 21 of a motor 22 which is supported by one of the legs 6 of the frame of the machine A.

Supported by the angle bars 1 of the frame of the machine A is a hopper 23 which is open at its top and is provided at its lower end with a discharge portion 24 that is fixed to the main body of the hopper. The discharge portion 24 of the hopper 23 includes opposed side wall portions 24a, and an inclined, rear wall portion 24b, the forward portion of said discharge portion being provided by an adjustable feed regulating plate 25 which is secured to a member 26. The member 26 is fixed to a shaft 27 which is supported for rocking movement in bearings provided by portions of the hopper 23, said shaft 27 having secured to an end thereof an operating arm 28 which is adapted to move in frictional contact with a plate 29 that is fixed to a part of the hopper structure whereby said operating arm 28 is retained by said plate 29 in various positions to which it is adjusted.

The opposed side walls of the discharge portion of the hopper, the lower edge of the inclined wall portion 24b of said discharge portion of the hopper, and the lower edge of the plate 29 provide a discharge opening for the hopper 23 at which is disposed a feed wheel 30. The feed wheel 30 is of a length approximately equal to the width of the traveling belt 13 and said feed wheel is provided with alternate ribs and depressions which are spaced circumferentially of the feed wheel and extend longitudinally thereof. The feed wheel is rigidly mounted on a shaft 31 which is supported for rotation by bearings provided by opposed wall portions of the discharge portion 24 of the hopper 23. At an outer end thereof the shaft 31 has fixedly mounted thereon a sprocket wheel 32 over which a sprocket chain 33 operates, said sprocket chain operating also over a sprocket wheel 34 fixedly mounted on the shaft 9.

When the machine A is in operation the motor 22, through operation of the sprocket chain 19 and the sprocket wheels 18 and 20, cause the endless belt to travel in the direction indicated by the feathered arrow adjacent to the upper flight of said endless belt in Fig. 1. Also such operation of the motor 22 causes the feed wheel 30 to be rotated in the direction indicated by the feathered arrow appearing adjacent to said feed wheel in Fig. 1, such movement being transmitted to said feed wheel from the shaft 9 through operation of the sprocket chain 33 and the sprocket wheels 32 and 34. The material to be operated on by the machine A is introduced into the hopper 23 of the machine and this material is withdrawn from the lower portion of the hopper and is fed onto the top surface of the upper flight of the endless belt 13 by the feed wheel 30, the plate 26 being capable of adjustment by manipulation of the operating arm 28 to provide greater or less space between the lower edge of said plate 26 and the periphery of the feed wheel to regulate the feed of material by the feed wheel onto the endless belt.

Supported by the upper pair of angle bars 1 of the frame of the machine A is a housing 35 which may be formed from sheet metal or any other suitable material. The housing 35 is disposed immediately above the upper flight of the endless belt 13, said housing 35 being of substantial depth from side to side as shown in Fig. 2. When viewed in vertical section, as shown in Fig. 1, the housing 35 includes a curved top wall 36 which merges into a downwardly and inwardly inclined wall 37, said inclined wall 37 merging into a curved bottom wall 38 which provides a channelway 38' at the bottom of the housing. The housing includes also a substantially straight outer wall 39 and a substantially straight inner wall 40 which is spaced from the wall 39 to provide an air duct 41 therebetween. The inner wall 40 is provided with an angular extension 43' at its upper end, and at the lower ends of said outer and inner walls 39 and 40 an extension 42 is secured thereto which includes outer and inner walls 42a and 42b which provides continuations of the walls 39 and 40 and a continuation 41' of the air duct 41. Also, an angularly projected wall portion 43 is extended from the inner portion of the curved bottom wall 38 of the housing to the wall 42b of the extension 42, and the wall 42a of said extension 42 at its lower end is provided with an upwardly and forwardly curved portion 44. As will be noted upon inspection of Fig. 1 the lower, open end of the air duct 41—41' is located immediately above the top surface of the upper flight of the endless belt 13.

Referring now to Fig. 2, it will be noted that the housing 35 is provided with opposed side walls 45 and 46 which extend from the upper end of the housing to a point spaced upwardly from the lower end thereof. The side wall 45 is provided with an opening 45' which is surrounded by an inwardly extended annular flange 47, and in horizontal alinement with said opening 45' the side wall 46 is provided with an opening 46'. At the opening 46' thereof the side wall 46 has fixedly mounted thereon an elongated bearing 48, said bearing including a web portion 48a which is secured to said side wall 46 and bearing portions 48b and 48c which extend, respectively, inwardly of the housing 35 and outwardly with respect thereto. Supported for rotation by the bearing 48 is a shaft 49 which has fixedly mounted thereon at one end thereof a spider 50, said spider including a hub portion from which radial arms are extended and being provided with an annular rim 50' of angular cross-sectional shape. The shaft 49 has fixedly mounted thereon, also, a supporting member 51 which includes a tubular portion that embraces the portion 48b of the bearing 48 and a disk portion provided with a rim in the form of an annular flange 51'. The rims of the spider 50 and the member 51 support a cylindrical element 49' formed from screening, or other suitable material which is pervious to air, said cylindrical element being adapted to rotate with said spider 50 and member 51 and with the shaft 49 by which they are rigidly supported.

Disposed in the channelway 38' at the lower end of the housing 35 is a screw conveyor 52 which is supported for rotation by bearings 53 and 54 located at opposite ends of said channelway, the portion 52' of the shaft of said screw conveyor which is supported by the bearing 54 being of less diameter than the portion of the shaft supported by the bearing 53. Also the bearing 54 includes as a part thereof a discharge spout 55 (Fig. 2) through which matter forming part of the material being acted on by the machine may pass from the channelway 38' to the exterior of the machine A. The lower portion of the housing 35 includes portions 56 and 57 which are secured to the side walls 45 and 46 of the housing and to the bearings 53 and 54, as shown in Fig. 2, said portions 56 and 57 being arranged in overlapping relation with respect to the opposite end portions of the screw conveyor 52 and being spaced apart transversely of the housing 35 to provide an opening 58 which leads from the interior of the upper portion of the housing to the channelway 38' thereof. The inner walls of the portions 56 and 57 are preferably inclined, as shown in Fig. 2, to facilitate passage of material through the opening 58 into the channelway 38'.

Associated with the housing 35 and supported by the wall 45 thereof is a blower fan 59 which includes a housing 60 having an air discharge portion 60' with which an air-discharge conduit 61 is associated, said air discharge portion 60' being provided with air controlling means 60a. The interior of the blower fan housing is in communication, through the opening 45', directly with the interior of the cylindrical element 49', and with the interior of the housing 35 through the pervious wall of said cylindrical element, and said blower fan housing has mounted therein for rotary operation the blade structure 62 of the blower fan 59. The blade structure 62 of the blower fan 59 is subjected to rotary motion by an electric motor 63 which is supported by the housing of the blower fan, and the shaft 62' of the blower fan, which is a continuation of the power shaft of the motor 63, has fixedly mounted thereon a pulley 64. Operating over the pulley 64 is a power transmission belt 65 which operates also over a pulley 66 of larger diameter which is fixed to the shaft of the screw conveyor 52, said screw conveyor shaft at its opposite end having fixed thereto a sprocket wheel 67 over which a sprocket chain 68 operates that operates also over a sprocket wheel 69 fixed to the shaft 49.

By referring to Fig. 1 it will be noted that pair of lower angle bars 2 support a chute 70 which is open at the top and is provided with a downwardly and rearwardly inclined lower wall, said chute being located below the portion of the endless belt 13 located between the hopper 23 and the housing 35. Also at the forward end of the machine A, the pair of lower angle bars 2 support a downwardly and forwardly inclined chute 71 whose open upper end is disposed beneath the forward portion of the endless belt 13 as it passes about the forward pulley 12.

In the operation of the machine A material which has been acted upon by a shelling machine is deposited in the hopper 23 and said material is fed onto the surface of the upper flight of the endless belt 13 by the feed wheel 30 and the plate 25 as has been previously explained herein, said endless belt being subjected to movement by the motor 22. The material fed onto the endless belt is made up of nut meats and shell fragments, the shell fragments being relatively light in weight when compared with the weight of the nut meats. The blade structure 62 of the blower fan 59, being subjected to rotary movement by the motor 63, will draw air through the pervious upper flight of the endless belt 13 and through the material carried thereby, with the result that the lighter shell particles will be drawn upwardly through the air duct 41—41' of the housing 35. The course of the air drawn through the upper flight of the endless belt 13 by the blower fan as it leaves the upper end of the air duct 41 is through the pervious wall of the cylindrical element 49', through the opening 45 in the side wall of the housing 35 into the blower fan housing 60, and from said blower fan housing by way of the air-discharge conduit 61. The air and shell fragments pass upwardly through the air duct 41—41' at a relatively high velocity and as this mixture passes over the cylindrical element 49' in a counter-clockwise rotary motion the heavier particles are thrown outwardly against the wall 36 by centrifugal action and some of the air is drawn through the pervious wall of the cylindrical element 49'. As this action progresses through the air duct 41 in a counter-clockwise direction, the cross-sectional area of the air duct gradually increases which in turn gradually decreases the velocity of the air carrying the shell fragments. This allows the shell fragments to drop into the screw conveyor 52, while the remaining air passes upwardly through the pervious wall of the cylindrical element 49'. The wall extension 40' serves as a scraper to remove from the surface of the rotating cylindrical element 49' any shell particles which may adhere thereto. The rotating screw conveyor 52 within the channelway 38' feeds the shell fragments which drop into said channelway to the discharge chute 55 through which they pass into a suitable receptacle arranged below said discharge chute.

The nut meats, which are of such weight that they are not drawn into the housing 35 by the air passing through the pervious upper flight of the endless belt, pass over the forward end of the endless belt and drop into the chute 71 from which they pass into a receptacle arranged beneath the discharge end of said chute. Also any dust or very small shell fragments, which may pass through the interstices of the endless belt as the material being operated upon by the machine passes from the hopper 23 to the location of the housing 35, drop through the upper and lower flights of the belt and fall into the chute 70 to be conducted thereby to a receptacle arranged beneath said chute.

While only one shell fragment removing unit is illustrated in the drawing it is obvious that as many of these units as may be required to properly perform the function of the machine may be employed, such plurality of units to be spaced longitudinally of the machine so that the material being operated upon by the machine is successively subjected to shell fragment removing operations as said material moves with the traveling belt toward the discharge end of the machine.

While the present invention is described herein as being adapted particularly for use in separating meats and shell fragments of edible nuts it, obviously, may be employed to effect separation of portions of any material wherein difference of mass or weight may be selected as the factor of separation.

I claim:

1. A separating apparatus comprising a housing having a duct leading into the interior thereof which is open at its outer end and provides a passageway into the interior of the housing for a stream of air and material carried by said stream of air which is to be separated therefrom, a rotatably supported cylindrical member arranged within said housing and provided with a pervious circumferential wall, means for rotating said cylindrical member at high speed, and air moving means located at an end of said cylindrical member for drawing a stream of material laden air through said duct from the exterior of the housing into the interior of said housing and for drawing air through the pervious wall of said cylindrical member into and longitudinally with respect to said cylindrical member, particles making up the material carried by said stream of air being separated from the stream of air by the pervious wall of said cylindrical member and said particles of material being thrown outwardly from the cylindrical member by centrifugal force created by the rotation of said cylindrical member.

2. A separating apparatus comprising a housing having a duct leading into the interior thereof which is open at its outer end and provides a passageway into the interior of the housing for a stream of air and material carried by said stream of air which is to be separated therefrom, a rotatably supported cylindrical member arranged within said housing and provided with a pervious circumferential wall, means for rotating said cylindrical member at high speed, and air moving means located at an end of said cylindrical member for drawing a stream of material laden air through said duct from the exterior of the housing into the interior of said housing and for drawing air through the pervious wall of said cylindrical member into and longitudinally with respect to said cylindrical member, particles making up the material carried by said stream of air being separated from the stream of air by the pervious wall of said cylindrical member and said particles of material being thrown outwardly from the cylindrical member by centrifugal force created by the rotation of said cylindrical member, said cylindrical member being so disposed within said housing and with respect to said duct that a path for the stream of air is provided within the housing which gradually increases in cross-sectional area and thereby provides for a gradual decrease in velocity of the stream of air moving through the air path.

3. A separating apparatus comprising a housing having a substantially straight vertically disposed duct leading into the interior thereof which is open at its lower end at the exterior of the housing and provides a passageway into the interior of the housing for a stream of air and material carried by said stream of air which is to be separated therefrom, a rotatably supported cylindrical member arranged within said housing and provided with a pervious circumferential wall, said substantially straight vertically disposed duct terminating at its upper end immediately adjacent to the pervious circumferential wall of said cylindrical member, means for rotating said cylindrical member at high speed, and air moving means located at an end of said cylindrical member for drawing a stream of material laden air through said duct from the exterior of the housing into the interior of said housing and for drawing air through the pervious wall of said cylindrical member into and longitudinally with respect to said cylindrical member, particles making up the material carried by said stream of air being separated from the stream of air by the pervious wall of said cylindrical member and said particles of material being thrown outwardly from the cylindrical member by centrifugal force created by the rotation of said cylindrical member, said cylindrical member being disposed eccentrically within said housing and so disposed with respect to said duct that a path for the stream of air is provided within the housing which gradually increases in cross-sectional area and thereby provides for a gradual decrease in velocity of the stream of air moving through the air path.

LEO J. MEYER.